(12) United States Patent
Bolan et al.

(10) Patent No.: US 8,194,661 B2
(45) Date of Patent: Jun. 5, 2012

(54) AUTOCONFIGURATION OF AN IPV6 COMPONENT IN A SEGMENTED NETWORK

(75) Inventors: Joseph E. Bolan, Cary, NC (US); Keith M. Campbell, Cary, NC (US); Phuong T. Nguyen, Cary, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 261 days.

(21) Appl. No.: 12/570,663

(22) Filed: Sep. 30, 2009

(65) Prior Publication Data

US 2011/0075666 A1  Mar. 31, 2011

(51) Int. Cl.
*H04L 12/28* (2006.01)
*H04L 12/56* (2006.01)
*H04L 12/54* (2006.01)
*H04J 3/26* (2006.01)
*G06F 15/16* (2006.01)
*G06F 15/173* (2006.01)

(52) U.S. Cl. ............... 370/390; 370/392; 370/395.52; 370/401; 370/428; 370/432; 709/230; 709/238

(58) Field of Classification Search .............. 370/390, 370/392, 395.52, 401, 428, 432; 709/230, 709/238
See application file for complete search history.

(56) References Cited

U.S. PATENT DOCUMENTS

| | | | |
|---|---|---|---|
| 6,917,618 B2 | 7/2005 | Thubert et al. | |
| 7,114,008 B2 | 9/2006 | Jungck et al. | |
| 7,251,215 B1 | 7/2007 | Turner et al. | |
| 7,333,461 B2 | 2/2008 | Thubert et al. | |
| 7,409,544 B2 | 8/2008 | Aura | |
| 2006/0092935 A1 | 5/2006 | Lakshman et al. | |
| 2006/0209885 A1 | 9/2006 | Hain et al. | |
| 2007/0180280 A1* | 8/2007 | Bolan et al. ............ | 713/300 |
| 2007/0268919 A1 | 11/2007 | Sarikaya et al. | |
| 2008/0205401 A1* | 8/2008 | Mirtorabi et al. ......... | 370/392 |
| 2009/0225724 A1* | 9/2009 | Ohbayashi et al. ........ | 370/331 |

(Continued)

OTHER PUBLICATIONS

M. Wasserman; IPv6-to-IPv6 Network Address Translation (NAT66) draft-mrw-behave-nat66-01.txt; Nov. 2008; pp. 1-15; Wasserman & Baker.
http://portal.acm.org/citation.cfm?id=1359409.

(Continued)

*Primary Examiner* — Alpus H Hsu
*Assistant Examiner* — Yee Lam
(74) *Attorney, Agent, or Firm* — Edward J. Lenart; Cynthia G. Seal; Biggers & Ohanian, LLP

(57) ABSTRACT

Autoconfiguration of an IPv6 component in a segmented network including receiving an IPv6 packet; determining whether the received IPv6 packet is a router advertisement or a router solicitation; if the received IPv6 packet is a router advertisement, then retrieving through an out-of-band link a MAC address for the IPv6 component, removing a MAC address of a sending router, inserting in the packet instead an internal MAC address for forwarding packets to the IPv6 component, removing a multicast destination MAC address, inserting in the packet the destination MAC address of the IPv6 component, and forwarding the packet to the IPv6 component as a unicast message; if the received IPv6 packet is a router solicitation, then removing the MAC address of the sending IPv6 component, inserting in the packet instead an external MAC address for forwarding packets to the router, and forwarding the packet to the router as a multicast message.

18 Claims, 5 Drawing Sheets

U.S. PATENT DOCUMENTS

2009/0252181 A1* 10/2009 Desanti .......................... 370/474
2010/0215019 A1* 8/2010 Velev et al. ................... 370/331
2010/0296481 A1* 11/2010 Weniger et al. ............... 370/331
2011/0051689 A1* 3/2011 Premec et al. ................. 370/331

OTHER PUBLICATIONS http://www.ietf.org/mail-archive/web/behave/current/msg04740.html.

* cited by examiner

AUTOCONFIGURATION OF AN IPV6 COMPONENT IN A SEGMENTED NETWORK

BACKGROUND OF THE INVENTION

1. Field of the Invention

The field of the invention is data processing, or, more specifically, methods, apparatus, and products for autoconfiguration of an IPv6 component in segmented network.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in data communications protocols. IPv6 is a new version of the internet protocol ('IP') which is designed to be an evolutionary step from IPv4. IPv6 supports autoconfiguration of IP addresses through router advertisements and router solicitations. However, such standard IPv6 autoconfiguration does not function as intended with confronted with segmented networks.

SUMMARY OF THE INVENTION

Autoconfiguration of an IPv6 component in a segmented network including receiving, by a management module of the segmented network, an IPv6 packet; wherein the management module comprises a module of automated computing machinery; determining, by the management module of the segmented network, whether the received IPv6 packet is a router advertisement or a router solicitation; if the received IPv6 packet is a router advertisement, then retrieving, by the management module, through an out-of-band link a Media Access Control ('MAC') address for the IPv6 component, removing, by the management module from the packet, a MAC address of a sending router, inserting, by the management module, in the packet instead an internal MAC address for forwarding packets to the IPv6 component, removing, by the management module, a multicast destination MAC address, inserting, by the management module, in the packet the destination MAC address of the IPv6 component, and forwarding, by the management module, the packet to the IPv6 component as a unicast message; if the received IPv6 packet is a router solicitation, then removing, by the management module from the packet, the MAC address of the sending IPv6 component, inserting, by the management module, in the packet instead an external MAC address for forwarding packets to the router, and forwarding, by the management module, the packet to the router as a multicast message.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
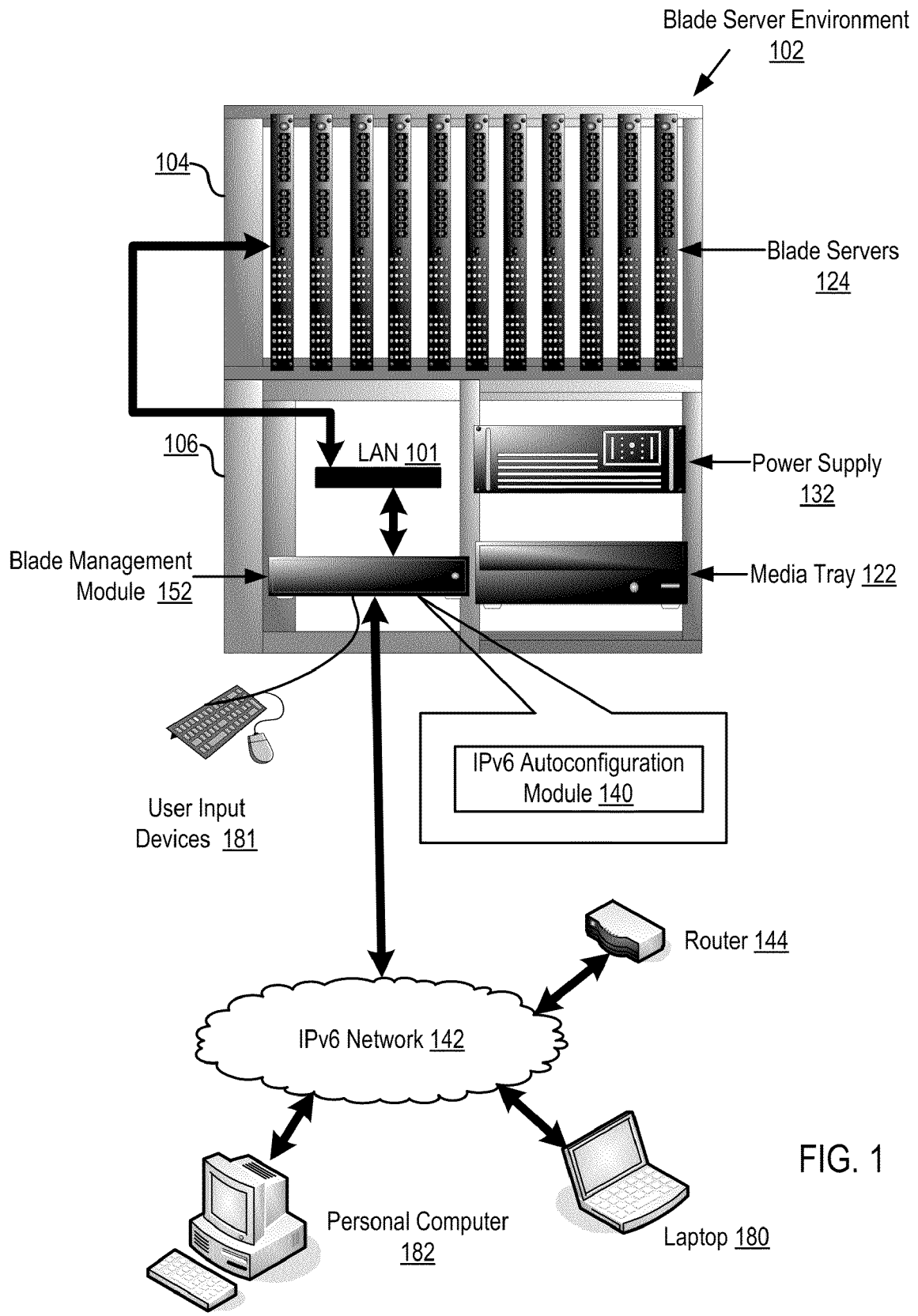
FIG. 1 sets forth a diagram of an example data processing system capable of autoconfiguration of an IPv6 component in a segmented network according to embodiments of the present invention.

Exemplary methods, apparatuses, and products for autoconfiguration of an IPv6 component in a segmented network in accordance with the present invention are described with reference to the accompanying drawings, beginning with FIG. 1. FIG. 1 sets forth a diagram of an example data processing system capable of autoconfiguration of an IPv6 component in a segmented network according to embodiments of the present invention. The data processing system of FIG. 1 includes a blade server environment (102). 'Blade server environment,' as the term is used in this specification, refers generally to a blade server system installed in this example in a two-bay chassis (104, 106) and including a number of blade servers (124), one or more blade management modules (152), a media tray (122), and a blade server system power supply (132).

The blade server environment (102) supports the IPv6 protocol internally and is coupled for external data communications through the management module (152) to an external IPv6 network having a router (144), a personal computer (182), and a laptop (180). The internal network of the blade server environment is therefore segmented from the external IPv6 network. A segmented network as that phrase is used in this specification means any network having two physically distinct sub-networks joined through a particular component. In the example of FIG. 1, the internal sub-network of the blade environment is physically distinct from the external sub-network including the router, personal computer, and laptop, and the two physically distinct sub-networks are joined through the management module of the blade server environment.

The blade management module (152) is a small computer in its own right, including software and hardware components, one or more computer processors and computer memory, that provides system management functions for all components in the example blade environment (102) including the blade servers (124) and the media tray (122). The blade management module of FIG. 1 also makes available connections for user input devices such as mice or keyboards (181) that are not generally connected directly to the blade servers or to the blade environment chassis. The blade servers themselves (124), installed in cabinet bay (104) of the exemplary blade environment (102) in the example of FIG. 1, are several computing devices implemented in blade form factor. The blade servers share access to the media tray (122). The blade servers (124) are connected to one another and to the blade management module (152) for data communications through a local area network ('LAN') (101). The LAN (101) is a small network installed within the chassis of the blade environment.

The media tray (122) houses non-volatile memory media generally. A media tray may typically include Compact Disc read-only media drives (CD-ROM), Digital Video Disc ROM drives (DVD-ROM), CD-RW drives, DVD-RW drives, floppy disk drives, and so on as will occur those of skill in the art.

The blade server environment (102) of FIG. 1 has a number of IPv6 components that may be autoconfigured according to embodiments of the present invention such as I/O modules for the blade servers, Baseboard Management Controllers, and others as will occur to those of skill in the art. The blade management module (152) of FIG. 1 has installed upon it an IPv6 autoconfiguration module (140), computer program instructions for autoconfiguration of an IPv6 component in a segmented network according to embodiments of the present invention. The blade management module (152) is therefore capable of autoconfiguration of an IPv6 component in the blade server environment by receiving an IPv6 packet and determining whether the received IPv6 packet is a router advertisement or a router solicitation. A router advertisement is multicast IPv6 message sent by a router to IPv6 components for autoconfiguration. Such IPv6 components listen for such router advertisements and upon receipt of such an advertisement may configure a valid IP address from the prefixes contained in the router advertisement. A router solicitation is a multicast IPv6 message sent by an IPv6 component requesting that routers receiving the router solicitation respond with a router advertisement containing prefixes such that the IPv6 component sending the router solicitation may be configured with a valid IP address.

If the received IPv6 packet is a router advertisement, then the blade management module (152) retrieves through an out-of-band link a Media Access Control (MAC) address for the IPv6 component. Such an out-of-band link is a data communications path outside the path intended for IPv6 data communications. Such an out-of-band link may be implemented as a dedicated physical link.

The blade management module (152) removes, from the packet, a MAC address of a sending router, inserts in the packet instead an internal MAC address for forwarding packets to the IPv6 component, removes a multicast destination MAC address, inserts in the packet the destination MAC address of the IPv6 component, and forwards the packet to the IPv6 component as a unicast message. A multicast message is a message sent to a number of nodes on a network. Multicast messages are distinct from unicast messages which are sent to a selected node on a network.

If the received IPv6 packet is a router solicitation, then the blade management module (152) removes, from the packet, the MAC address of the sending IPv6 component, inserts in the packet instead an external MAC address for forwarding packets to the router, and forwards the packet to the router as a multicast message. If the received IPv6 packet is a router solicitation, the blade management also receives in response to the solicitation a router advertisement; removes a MAC address of the sending router; inserts in the packet instead an internal MAC address for forwarding packets to the component; and forwards the packet to the component as a unicast message or a multicast message. A multicast message is a message sent to a number of nodes on a network. Multicast messages are distinct from unicast messages which are sent to a selected node on a network.

Upon receiving the router advertisement the IPv6 component may configure a valid IP address from the prefixes contained in the router advertisement. Once so configured, the blade management module maintains a list of components and their IP addresses and MAC addresses. Such a list may time out as the IP addresses may be valid only for a predetermined period of time.

The arrangement of the blade environment (102), IPv6 network (101), LAN (101) and other devices making up the exemplary system illustrated in FIG. 1 are for explanation, not for limitation. Data processing systems useful according to various embodiments of the present invention for autoconfiguration of an IPv6 component in a segmented network may include additional servers, routers, and other devices, not shown in FIG. 2, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
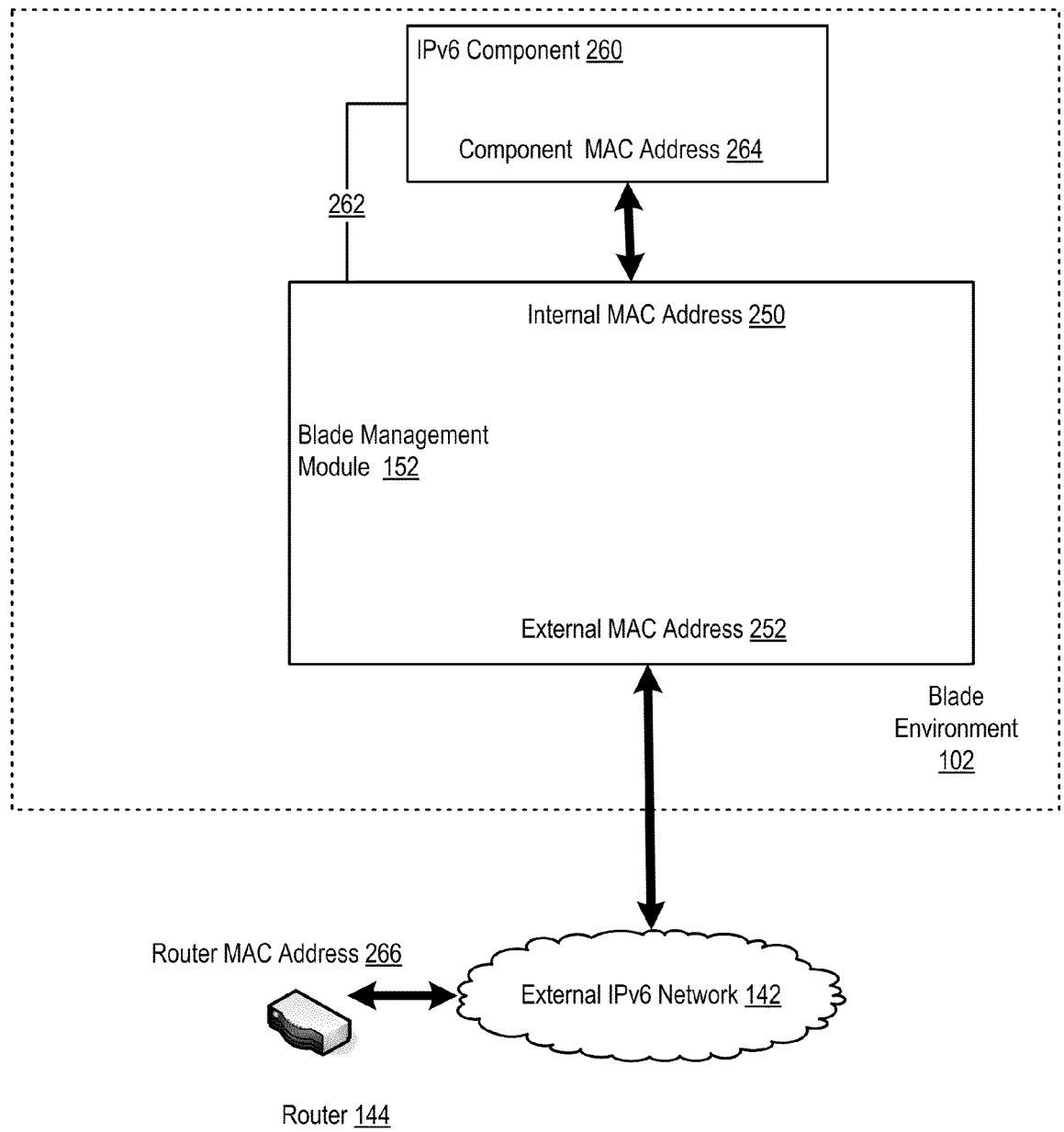
FIG. 2 sets forth a block diagram of a further example data processing system capable of autoconfiguration of an IPv6 component in a segmented network according to embodiments of the present invention.

For further explanation, FIG. 2 sets forth a block diagram of a further example data processing system capable of autoconfiguration of an IPv6 component in a segmented network according to embodiments of the present invention. In the example of FIG. 2, the blade management module maintains an internal MAC address (250) and an external MAC address (252) for autoconfiguration of the IPv6 component (250) within the blade environment. The blade management module of FIG. 2 is capable of autoconfiguration of the IPv6 component (250) in the segmented network of the blade environment (102) by receiving an IPv6 packet and determining whether the received IPv6 packet is a router advertisement or a router solicitation. If the received IPv6 packet is a router advertisement, the blade management module (152) is capable of retrieving through an out-of-band link (262) a Media Access Control ('MAC') address for the IPv6 component, removing, from the packet, a MAC address (266) of a sending router (144), inserting in the packet instead an internal MAC address (250) for forwarding packets to the IPv6 component (260), removing a multicast destination MAC address, inserting in the packet the destination MAC address (264) of the IPv6 component (260), and forwarding the packet to the IPv6 component (260) as a unicast message.

If the received IPv6 packet is a router solicitation, then the blade management module (152) is capable of removing, from the packet, the MAC address (264) of the sending IPv6 component (260), inserting in the packet instead an external MAC address (252) for forwarding packets to the router (144), and forwarding the packet to the router (266) as a multicast message. If the received IPv6 packet is a router solicitation, then the blade management module (152) is also capable of receiving in response to the solicitation a router advertisement; removing, from the packet, a MAC address (266) of the sending router (144); inserting in the packet instead an internal MAC address (250) for forwarding packets to the IPv6 component (260); and forwarding the packet to the IPv6 component (260) as a unicast message or a multicast message.

Figure 3:
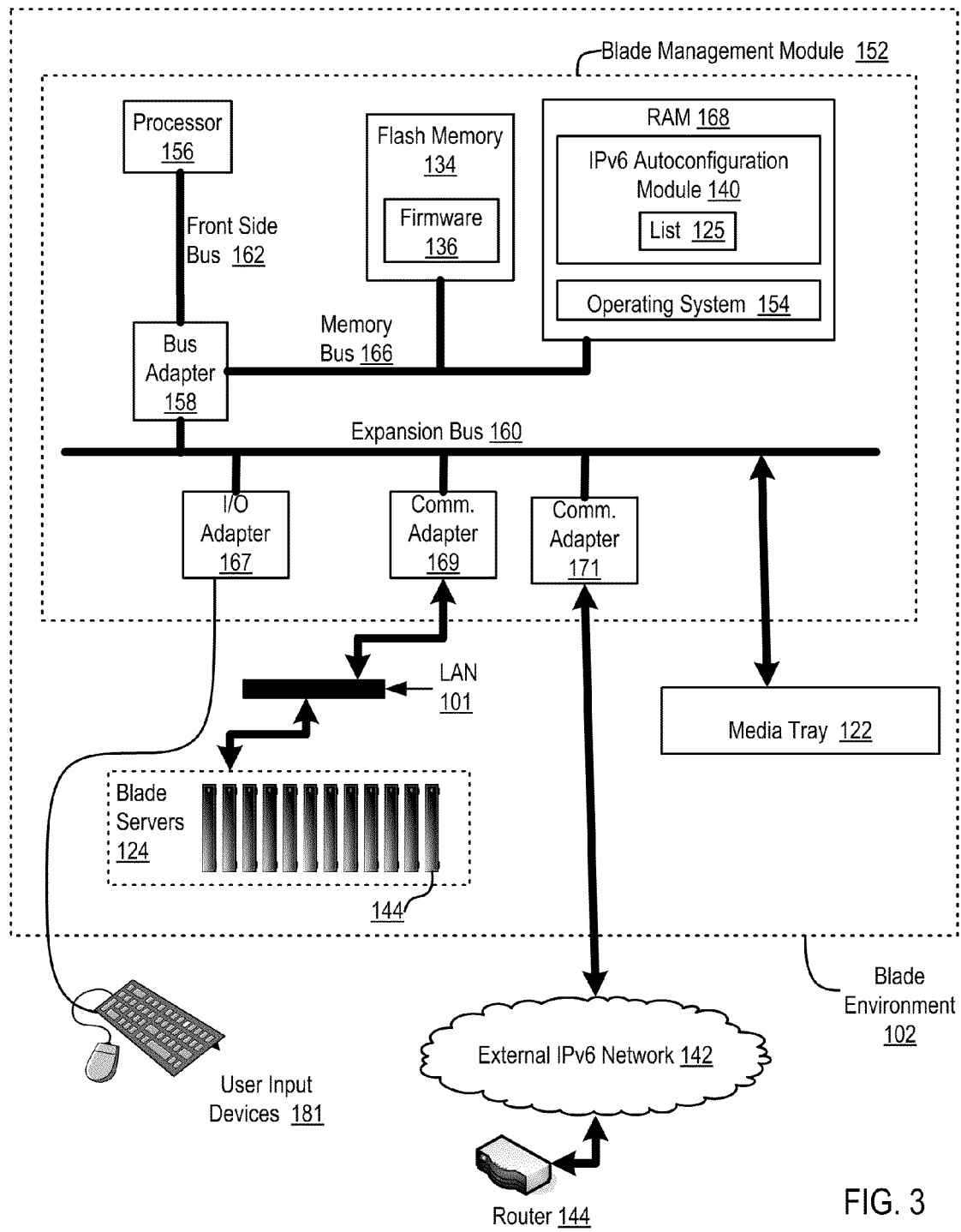
FIG. 3 sets forth a diagram of a further example data processing system capable of autoconfiguration of an IPv6 component in a segmented network according to embodiments of the present invention.

For further explanation, FIG. 3 sets forth a diagram of a further example data processing system capable of autoconfiguration of an IPv6 component in a segmented network according to embodiments of the present invention. The example data processing system of FIG. 3 is similar to the example of FIG. 1, including as it does a blade environment (102), blade servers (124) connected through an internal LAN (101) to a blade management module (152), a media tray (122) connected to the blade management module. In addition, however, by contrast with FIG. 1, FIG. 3 also includes a functional block diagram showing more detail of the blade management module (152). The blade management module (152) of FIG. 1 includes at least one computer processor (156) or 'CPU' as well as random access memory (168) ('RAM') which is connected through a high speed memory bus (166) and bus adapter (158) to processor (156) and to other components of the blade management module (152).

Stored in RAM in this example is an IPv6 autoconfiguration module (140), computer program instructions for autoconfiguration of an IPv6 component in a segmented network according to embodiments of the present invention. The IPv6 autoconfiguration module (140) includes computer program instructions for receiving an IPv6 packet; determining whether the received IPv6 packet is a router advertisement or a router solicitation; if the received IPv6 packet is a router advertisement, then retrieving through an out-of-band link a Media Access Control ('MAC') address for the IPv6 component, removing a MAC address of a sending router, inserting in the packet instead an internal MAC address for forwarding packets to the IPv6 component, removing a multicast destination MAC address, inserting in the packet the destination MAC address of the IPv6 component, and forwarding the packet to the IPv6 component as a unicast message. The IPv6 autoconfiguration module also may include computer program instructions for removing a multicast destination MAC address from the payload of the received packet and inserting in the payload of the packet the destination MAC address of the IPv6 component if the received IPv6 packet is a router advertisement.

The IPv6 autoconfiguration module (140) also includes computer program instructions for removing, from the packet, the MAC address of the sending IPv6 component; inserting in the packet instead an external MAC address for forwarding packets to the router; forwarding the packet to the router as a multicast message if the received IPv6 packet is a router solicitation (322); receiving in response to the solicitation a router advertisement; removing, from the packet, a MAC address of the sending router; inserting in the packet instead an internal MAC address for forwarding packets to the IPv6 component; and forwarding the packet to the IPv6 component as a unicast message or multicast message if the received IPv6 packet is a router solicitation.

Upon receiving a router advertisement the IPv6 component may configure a valid IP address from the prefixes contained in the router advertisement. Once so configured, the blade management module maintains a list (125) of components and their IP addresses and MAC addresses. Such a list may time out as the IP addresses may be valid only for a predetermined period of time.

Also stored in RAM (168) is an operating system (154). Operating systems useful for autoconfiguration of an IPv6 component in a segmented network according to embodiments of the present invention include UNIX™, Linux™, Microsoft Windows XP™, Microsoft Vista™, AIX™, IBM's i5/OS™, and others as will occur to those of skill in the art. The operating system (154) and the IPv6 autoconfiguration module (140) in the example of FIG. 3 are shown in RAM (168), but many components of such software typically are stored in non-volatile memory also, such as, for example, on a disk drive or in firmware (136) on an EEPROM drive, here shown as flash memory (134).

The exemplary blade management module (152) of FIG. 3 includes one or more input/output ('I/O') adapters (167). I/O adapters implement user-oriented input/output through, for example, software drivers and computer hardware for controlling output to display devices such as computer display screens, as well as user input from user input devices (181) such as keyboards and mice.

The exemplary blade management module (152) of FIG. 3 also includes a communications adapter (169) that couples the blade management module (152) internally within the blade environment (102) for data communications with blade servers (124) through a local area network (101) and a communications adapter (171) that couples the blade management module (152) externally for data communications with the external IPv6 network. The networks (101) may be implemented, for example, as an Internet Protocol ('IP') network or an Ethernet network, an PC network, a System Management Bus ('SMBus'), an Intelligent Platform Management Bus ('IPMB'), for example, and in other ways as will occur to those of skill in the art. Such a communications adapters (169 and 171) are electronic modules that implement the hardware level of data communications through which one computer sends data communications to another computer through a data communications network. Examples of communications adapters useful according to embodiments of the present invention include modems for wired dial-up communications, Ethernet (IEEE 802.3) adapters for wired data communications network communications, and 802.11 adapters for wireless data communications network communications.

The arrangement of the blade management module (152), the blade servers (124), and other devices making up the exemplary system illustrated in FIG. 3 are for explanation, not for limitation. Data processing systems useful according to various embodiments of the present invention for autoconfiguration of an IPv6 component in a segmented network may include additional servers, routers, and other devices, not shown in FIG. 3, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 3.

Figure 4:
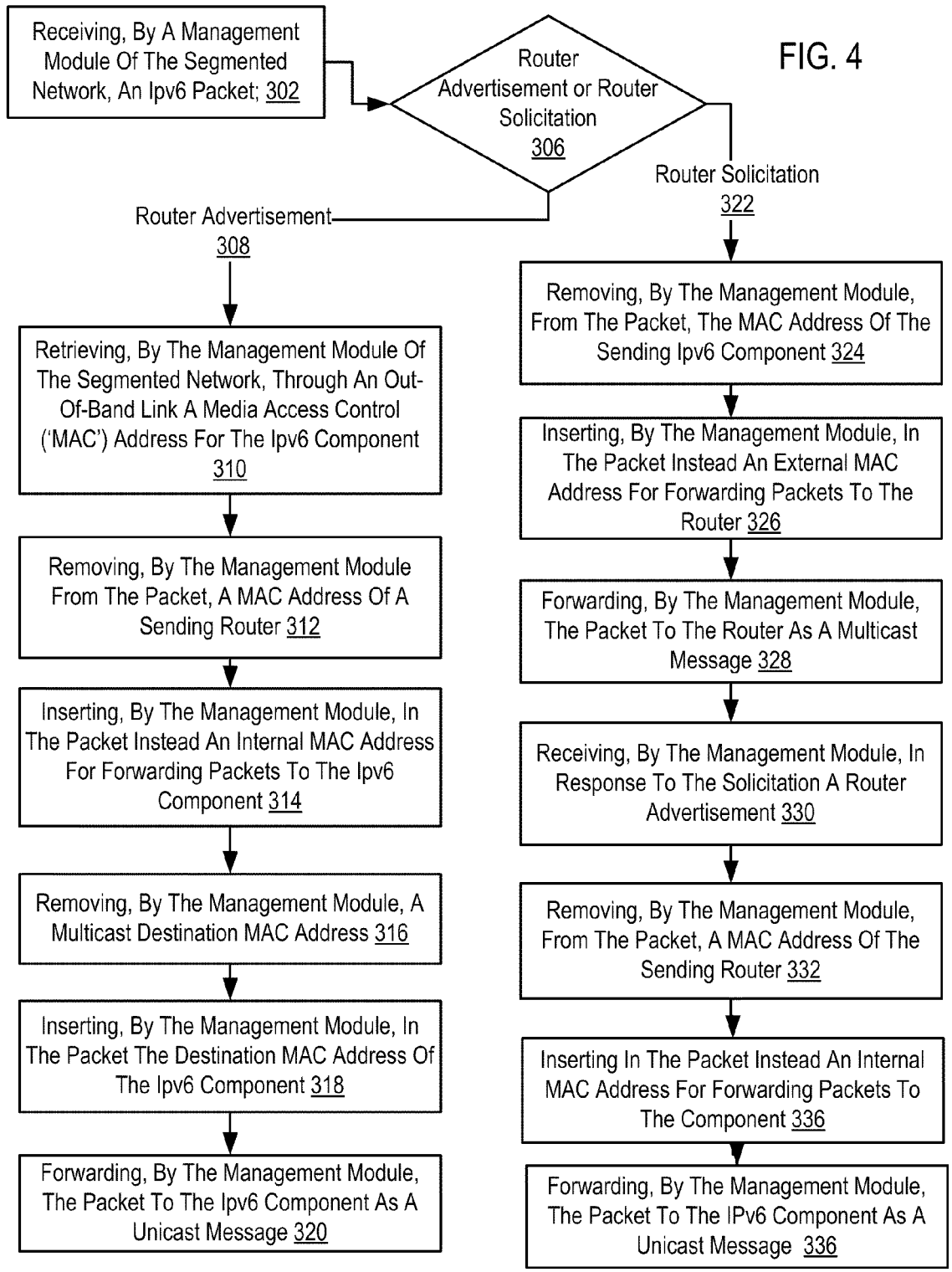
FIG. 4 sets forth a flow chart illustrating an exemplary method of IPv6 autoconfiguration of an IPv6 component in segmented network according to embodiments of the present invention.

For further explanation, FIG. 4 sets forth a flow chart illustrating an exemplary method of IPv6 autoconfiguration of an IPv6 component in segmented network according to embodiments of the present invention. The method of FIG. 4 includes receiving (302), by a management module of the segmented network, an IPv6 packet and determining (306), by the management module of the segmented network, whether the received IPv6 packet is a router advertisement or a router solicitation. Determining (306), by the management module of the segmented network, whether the received IPv6 packet is a router advertisement or a router solicitation may be carried out by reading a value from a type field in the IPv6 packet. Predetermined values are assigned to router advertisement packets and to router solicitation packets.

If the received IPv6 packet is a router advertisement (308), then the method of FIG. 4 includes retrieving (310), by the management module, through an out-of-band link a Media Access Control ('MAC') address for the IPv6 component. Retrieving (310), by the management module, through an out-of-band link a MAC address for the IPv6 component may be carried out by querying the IPv6 component though the out of band link.

If the received IPv6 packet is a router advertisement (308), then the method of FIG. 4 also includes removing (312), by the management module from the packet, a MAC address of a sending router. Removing (312), by the management module from the packet, a MAC address of a sending router may be carried out by deleting the MAC address of a sending router from the source field in a link layer or Ethernet header of the packet.

If the received IPv6 packet is a router advertisement (308), then the method of FIG. 4 also includes inserting (314), by the management module, in the packet instead an internal MAC address for forwarding packets to the IPv6 component. Inserting (314), by the management module, in the packet instead an internal MAC address for forwarding packets to the IPv6 component includes writing in the source field of the link layer header of the packet the internal MAC address for forwarding packets.

Also if the received IPv6 packet is a router advertisement (308), then the method of FIG. 4 also includes removing (316), by the management module, a multicast destination MAC address and inserting (318), by the management module, in the packet the destination MAC address of the IPv6 component. Removing (316), by the management module, a multicast destination MAC address may be carried out by deleting the multicast destination address from a field of the header of the packet. Inserting (318), by the management module, in the packet the destination MAC address of the IPv6 component further comprises writing the MAC address of the IPv6 component to the header of the packet.

If the received IPv6 packet is a router advertisement (308), then the method of FIG. 4 also includes forwarding (320), by the management module, the packet to the IPv6 component as a unicast message. Forwarding (320), by the management module, the packet to the IPv6 component as a unicast message may be carried out by sending the packet as a unicast message to the IPv6 component.

If the received IPv6 packet is a router solicitation (322), then the method of FIG. 4 includes removing (324), by the management module from the packet, the MAC address of the sending IPv6 component. Removing (324), by the management module from the packet, the MAC address of the sending IPv6 component may be carried out by deleting the MAC address of the sending IPv6 component.

If the received IPv6 packet is a router solicitation (322), then the method of FIG. 4 also includes inserting (326), by the management module, in the packet instead an external MAC address for forwarding packets to the router. Inserting (326), by the management module, in the packet instead an external MAC address for forwarding packets to the router may be carried out by writing in a field in the packet header an external MAC address for forwarding packets to the router.

If the received IPv6 packet is a router solicitation (322), then the method of FIG. 4 also includes forwarding (328), by the management module, the packet to the router as a multicast message. Forwarding (328), by the management module, the packet to the router as a multicast message is carried out by sending the packet to the router as a multicast message.

If the received IPv6 packet is a router solicitation (322), then the method of FIG. 4 also includes receiving (330), by the management module, in response to the solicitation a router advertisement and removing (332), by the management module from the packet, a MAC address of the sending router. Removing (332), by the management module from the packet, a MAC address of the sending router may be carried out by deleting the MAC address of the sending router from a field in the header of the packet.

If the received IPv6 packet is a router solicitation (322), then the method of FIG. 4 also includes inserting (334), by the management module, in the packet instead an internal MAC address for forwarding packets to the component. Inserting (334), by the management module, in the packet instead an internal MAC address for forwarding packets to the component may be carried out by writing an internal MAC address for forwarding packets to the component in a field in the packet header.

If the received IPv6 packet is a router solicitation (322), then the method of FIG. 4 also includes forwarding (336), by the management module, the packet to the component as a unicast message or a multicast message. In alternative embodiments the packet may be forwarded to the IPv6 component as either a multicast message or a unicast message.

In some embodiments of the preset invention, router advertisements include a multicast destination MAC address in the payload of the packet. For further explanation, therefore, FIG. 5 sets forth a flow chart illustrating an additional method of autoconfiguration of an IPv6 component in a segmented network. The method of FIG. 5 is similar to the method of FIG. 4 in that the method of FIG. 5 includes receiving (302), by a management module of the segmented network, an IPv6 packet; determining (306), by the management module of the segmented network, whether the received IPv6 packet is a router advertisement or a router solicitation; if the received IPv6 packet is a router advertisement (308), then retrieving (310), by the management module, through an out-of-band link a Media Access Control ('MAC') address for the IPv6 component, removing (312), by the management module from the packet, a MAC address of a sending router, inserting (314), by the management module, in the packet instead an internal MAC address for forwarding packets to the IPv6 component, removing (316), by the management module, a multicast destination MAC address, inserting (318), by the management module, in the packet the destination MAC address of the IPv6 component, and forwarding (320), by the management module, the packet to the IPv6 component as a unicast message; and if the received IPv6 packet is a router solicitation (322), then removing (324), by the management module from the packet, the MAC address of the sending IPv6 component, inserting (326), by the management module, in the packet instead an external MAC address for forwarding packets to the router, and forwarding (328), by the management module, the packet to the router as a multicast message, receiving (330), by the management module, in response to the solicitation a router advertisement; removing (332), by the management module from the packet, a MAC address of the sending router; inserting (334), by the management module, in the packet instead an internal MAC address for forwarding packets to the IPv6 component; and forwarding (336), by the management module, the packet to the IPv6 component as a unicast message or multicast message.

Figure 5:
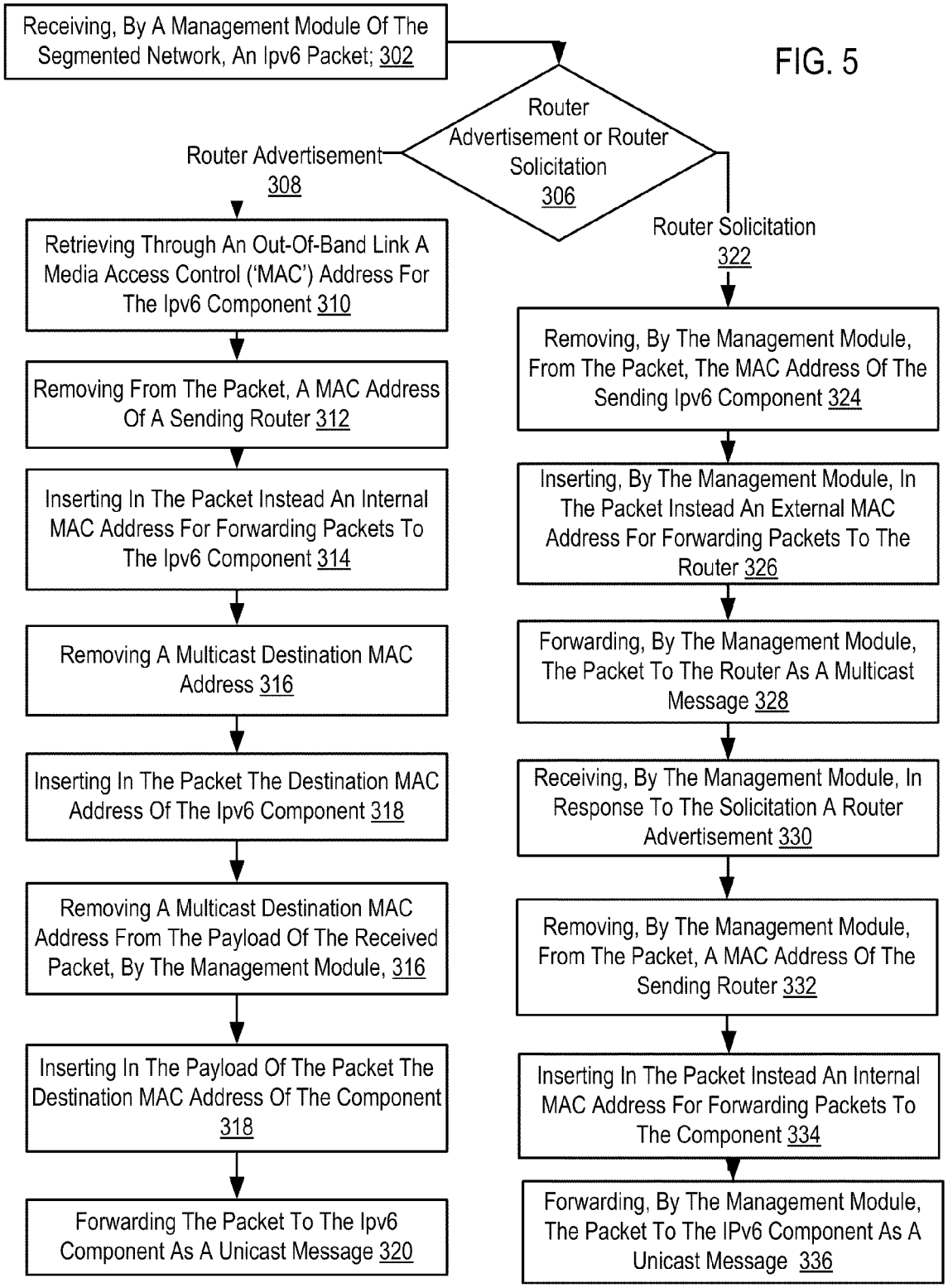
FIG. 5 sets forth a flow chart illustrating an additional method of autoconfiguration of an IPv6 component in a segmented network.

The method of FIG. 5 differs from the method of FIG. 4 in that the method of FIG. 5 also includes removing (340), by the management module, a multicast destination MAC address from the payload of the received packet; and inserting (342), by the management module, in the payload of the packet the destination MAC address of the IPv6 component if the received IPv6 packet is a router advertisement (308). Removing (340), by the management module, a multicast destination MAC address from the payload of the received packet may be carried out by deleting a multicast destination MAC address from the payload section of the received packet. Inserting (342), by the management module, in the payload of the packet the destination MAC address of the IPv6 component may be carried out by writing in the payload section of the packet the destination MAC address of the IPv6 component.

Exemplary embodiments of the present invention are described largely in the context of a fully functional computer system for autoconfiguration of an IPv6 component in a segmented network. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of autoconfiguration of an IPv6 (Internet Protocol version 6) component in a segmented network, the method comprising:
   receiving, by a management module of the segmented network, an IPv6 packet;
   wherein the management module comprises a module of automated computing machinery;
   determining, by the management module of the segmented network, whether the received IPv6 packet is a router advertisement or a router solicitation;
   if the received IPv6 packet is a router advertisement, then retrieving, by the management module, through an out-of-band link a destination Media Access Control ('MAC') address for an IPv6 component, removing, by the management module from the received IPv6 packet, a MAC address of a sending router, inserting, by the management module, in the packet instead an internal MAC address for forwarding packets to the IPv6 component, removing, by the management module, a multicast destination MAC address, inserting, by the management module, in the packet the destination MAC address of the IPv6 component, and forwarding, by the management module, the packet to the IPv6 component as a unicast message;
   if the received IPv6 packet is a router solicitation, then removing, by the management module from the packet, the MAC address of the sending IPv6 component, inserting, by the management module, in the packet instead an external MAC address for forwarding packets to a router, and forwarding, by the management module, the packet to the router as a multicast message.

2. The method of claim 1 wherein if the received IPv6 packet is the router solicitation, the method further comprises:
   receiving, by the management module, in response to the solicitation a router advertisement;
   removing, by the management module from the packet, a MAC address of the router;
   inserting, by the management module, in the packet instead an internal MAC address for forwarding packets to the IPv6 component; and
   forwarding, by the management module, the packet to the IPv6 component as a unicast message.

3. The method of claim 1 wherein if the received IPv6 packet is the router solicitation, the method further comprises:
   receiving, by the management module, in response to the solicitation a router advertisement;
   removing, by the management module from the packet, a MAC address of the router;
   inserting, by the management module, in the packet instead an internal MAC address for forwarding packets to the IPv6 component,
   forwarding, by the management module, the packet to the IPv6 component as a multicast message.

4. The method of claim 1 wherein if the received IPv6 packet is the router advertisement, the method further comprises:
   removing, by the management module, a multicast destination MAC address from a payload of the received packet; and
   inserting, by the management module, in the payload of the packet the destination MAC address of the IPv6 component.

5. The method of claim 1 wherein the IPv6 component is an input/output module for a blade server.

6. The method of claim 1 wherein the segmented network comprises a blade server environment.

7. An apparatus for autoconfiguration of an IPv6 (Internet Protocol version 6) component in a segmented network, the apparatus comprising a computer processor, a computer memory operatively coupled to the computer processor, the computer memory having disposed within it computer program instructions for:
   receiving, by a management module of the segmented network, an IPv6 packet;
   wherein the management module comprises a module of automated computing machinery;
   determining, by the management module of the segmented network, whether the received IPv6 packet is a router advertisement or a router solicitation;
   if the received IPv6 packet is a router advertisement, then retrieving, by the management module, through an out-of-band link a destination Media Access Control ('MAC') address for the IPv6 component, removing, by the management module from the packet, a MAC address of a sending router, inserting, by the management module, in the packet instead an internal MAC address for forwarding packets to the IPv6 component, removing, by the management module, a multicast destination MAC address, inserting, by the management module, in the packet the destination MAC address of the IPv6 component, and forwarding, by the management module, the packet to the IPv6 component as a unicast message;

if the received IPv6 packet is a router solicitation, then removing, by the management module from the packet, the MAC address of the sending IPv6 component, inserting, by the management module, in the packet instead an external MAC address for forwarding packets to a router, and forwarding, by the management module, the packet to the router as a multicast message.

8. The apparatus of claim 7 wherein the computer memory also has disposed within it computer program instructions for:
receiving, by the management module, in response to the solicitation a router advertisement if the received IPv6 packet is the router solicitation;
removing, by the management module from the packet, a MAC address of the router;
inserting, by the management module, in the packet instead an internal MAC address for forwarding packets to the IPv6 component; and
forwarding, by the management module, the packet to the IPv6 component as a unicast message.

9. The apparatus of claim 7 wherein the computer memory also has disposed within it computer program instructions for:
receiving, by the management module, in response to the solicitation a router advertisement if the received IPv6 packet is the router solicitation;
removing, by the management module from the packet, a MAC address of the router;
inserting, by the management module, in the packet instead an internal MAC address for forwarding packets to the IPv6 component,
forwarding, by the management module, the packet to the IPv6 component as a multicast message.

10. The apparatus of claim 7 wherein the computer memory also has disposed within it computer program instructions for:
removing, by the management module, a multicast destination MAC address from a payload of the received packet if the received IPv6 packet is the router advertisement; and
inserting, by the management module, in the payload of the packet the destination MAC address of the IPv6 component.

11. The apparatus of claim 7 wherein the IPv6 component is an input/output module for a blade server.

12. The apparatus of claim 7 wherein the segmented network comprises a blade server environment.

13. A computer program product for autoconfiguration of an IPv6 (Internet Protocol version 6) component in a segmented network, the computer program product disposed in a computer readable recordable storage medium, the computer program product comprising computer program instructions that, when executed, cause a computer processor to perform the steps of:
receiving, by a management module of the segmented network, an IPv6 packet;
wherein the management module comprises a module of automated computing machinery;
determining, by the management module of the segmented network, whether the received IPv6 packet is a router advertisement or a router solicitation;

if the received IPv6 packet is a router advertisement, then retrieving, by the management module, through an out-of-band link a destination Media Access Control ('MAC') address for the IPv6 component, removing, by the management module from the packet, a MAC address of a sending router, inserting, by the management module, in the packet instead an internal MAC address for forwarding packets to the IPv6 component, removing, by the management module, a multicast destination MAC address, inserting, by the management module, in the packet the destination MAC address of the IPv6 component, and forwarding, by the management module, the packet to the IPv6 component as a unicast message;

if the received IPv6 packet is a router solicitation, then removing, by the management module from the packet, the MAC address of the sending IPv6 component, inserting, by the management module, in the packet instead an external MAC address for forwarding packets to a router, and forwarding, by the management module, the packet to the router as a multicast message.

14. The computer program product of claim 13 further comprising computer program instructions that, when executed, cause a computer processor to perform the steps of:
receiving, by the management module, in response to the solicitation a router advertisement if the received IPv6 packet is the router solicitation;
removing, by the management module from the packet, a MAC address of the router;
inserting, by the management module, in the packet instead an internal MAC address for forwarding packets to the IPv6 component; and
forwarding, by the management module, the packet to the IPv6 component as a unicast message.

15. The computer program product of claim 13 further comprising computer program instructions that, when executed, cause a computer processor to perform the steps of:
receiving, by the management module, in response to the solicitation a router advertisement if the received IPv6 packet is the router solicitation;
removing, by the management module from the packet, a MAC address of the router;
inserting, by the management module, in the packet instead an internal MAC address for forwarding packets to the IPv6 component,
forwarding, by the management module, the packet to the IPv6 component as a multicast message.

16. The computer program product of claim 13 further comprising computer program instructions that, when executed, cause a computer processor to perform the steps of:
removing, by the management module, a multicast destination MAC address from a payload of the received packet if the received IPv6 packet is the router advertisement; and
inserting, by the management module, in the payload of the packet the destination MAC address of the IPv6 component.

17. The computer program product of claim 13 wherein the IPv6 component is an input/output module for a blade server.

18. The computer program product of claim 13 wherein the segmented network comprises a blade server environment.

* * * * *